United States Patent [19]

Borrman et al.

[11] Patent Number: 4,526,744
[45] Date of Patent: Jul. 2, 1985

[54] FUEL ASSEMBLY FOR A BOILING WATER REACTOR

[75] Inventors: Bo Borrman; Lars Leine; Olov Nylund; Bengt Ode, all of Västerås, Sweden

[73] Assignee: AB Asea-Atom, Västerås, Sweden

[21] Appl. No.: 372,765

[22] Filed: Apr. 28, 1982

[30] Foreign Application Priority Data

May 15, 1981 [SE] Sweden .............................. 81030579

[51] Int. Cl.$^3$ .............................................. G21C 3/34
[52] U.S. Cl. .................... 376/440; 376/438; 376/444; 376/434; 376/445; 376/446
[58] Field of Search ............... 376/440, 445, 446, 449, 376/443, 444, 439, 370, 377, 447, 438, 434

[56] References Cited

U.S. PATENT DOCUMENTS

| | | | |
|---|---|---|---|
| 3,133,867 | 5/1964 | Frisch | 376/438 |
| 3,158,543 | 11/1964 | Sherman et al. | 376/173 X |
| 3,164,530 | 1/1965 | Banks | 376/446 X |
| 3,379,618 | 4/1968 | Frisch | 376/445 X |
| 3,389,056 | 6/1968 | Frisch | 376/445 |
| 3,801,453 | 4/1974 | Jones | 376/446 X |
| 4,067,772 | 1/1978 | Kim | 376/370 X |
| 4,348,355 | 9/1982 | Nylund | 376/267 X |
| 4,454,093 | 6/1984 | Nylund et al. | 376/443 X |

FOREIGN PATENT DOCUMENTS

| | | |
|---|---|---|
| 1464735 | 2/1969 | Fed. Rep. of Germany . |
| 1806432 | 12/1969 | Fed. Rep. of Germany . |
| 2115406 | 12/1971 | Fed. Rep. of Germany . |
| 2331352 | 2/1974 | Fed. Rep. of Germany . |
| 3148458 | 7/1982 | Fed. Rep. of Germany . |

Primary Examiner—Harold J. Tudor
Assistant Examiner—Daniel Wasil
Attorney, Agent, or Firm—Pollock, Vande Sande & Priddy

[57] ABSTRACT

A fuel assembly for a boiling water reactor comprises a plurality of fuel rods (2, 2'), which constitute four partial bundles and are surrounded by a fuel channel system (1) comprising one partial tube for each partial bundle. Each of the four partial bundles rests on a bottom tie plate (19) and is positioned with respect to the others by means of a common top tie plate (31), which is provided with a lifting loop (33) which is sufficiently strong to be able to lift the four partial bundles simultaneously, a major part of the lifting force being transmitted to said bottom tie plates via a plurality of supporting fuel rods (2').

7 Claims, 16 Drawing Figures 4,526,744

FUEL ASSEMBLY FOR A BOILING WATER REACTOR

TECHNICAL FIELD

The present invention relates to a fuel assembly for a boiling water reactor, the fuel assembly comprising a plurality of vertical fuel rods, which are surrounded by a fuel channel device with a vertical longitudinal axis, the fuel rods constituting four partial bundles or subassemblies, the fuel rods in each partial bundle being positioned by means of a corresponding group of spacers arranged vertically one after the other, each of the partial bundles resting on a corresponding bottom grid.

BACKGROUND ART

A fuel assembly of this kind is known from U.K. Patent Specification No. 931,676. In the known fuel assembly the fuel rods are distributed among four partial bundles, each of which is provided with a bottom grid and with a top grid. Each fuel rod is provided with slotted end portions and arranged with the slots in engagement with and hard-soldered to the top grid and the bottom grid, respectively.

Further, such a fuel assembly is known from U.S. Pat. No. 3,389,056. Which discloses a fuel assembly in which the fuel rods are distributed among four partial bundles, which are positioned with respect to each other by means of a plurality of upwardly-directed fixing members, disposed outside the fuel channel device and extending from one partial bundle each, said fixing members being attached to the top grid of the reactor core.

With conventional boiling water reactor fuel assemblies of the kind comprising several partial bundles, it is not possible to lift all the partial bundles out of the fuel channel device in one and the same lifting operation.

DISCLOSURE OF THE INVENTION

The invention aims to provide a four-part fuel assembly which permits simplified and less time-consuming fuel handling than what is possible when using the above-mentioned prior art fuel assemblies.

According to the invention, the majority of the fuel rods in each partial bundle is arranged in the bottom grid freedom of movememnt in a direction vertically upwards. At least one fuel rod in each partial bundle is a tie rod which is detachably arranged in a tensile force transmitting connection with the bottom grid of the partial bundle. The partial bundles are positioned in relation to each other by means of a common top tie plate, positioned above the fuel rods and surrounded by an upper portion of said fuel channel device. The top tie plate is detachably arranged in a tensile force transmitting connection with the bottom grids by means of the tie rods and is provided with a lifting loop adapted for lifting all the partial bundles of the fuel assembly in one and the same lifting operation.

A simultaneous lifting is time-saving in case of inspection of the fuel and when, at a certain burnup stage, it is desirec to change the positions and/or orientations of the various partial bundles with a view to achieving better fuel economy.

BRIEF DESCRIPTION OF DRAWINGS

In the following the invention will be described with reference to the different figures on the acompanying schematic drawings.

FIGS. 1, 2, 3, 4 and 5 show a first embodiment of the invention, wherein

FIG. 1 is a vertical section along I—I of FIGS. 2, 3, 4 and 5; whereas,

FIGS. 2, 3, 4 and 5 show horizontal sections along, respectively, II—II, III—III, IV—IV and V—V of FIG. 1.

FIGS. 6, 7 and 8 show a second embodiment of the invention, wherein FIG. 6 shows a partial vertical section of a fuel assembly along IV—VI of FIG. 7; whereas, FIGS. 7 and 8 show horizontal sections along VII—VII and VIII—VIII, respectively, of FIG. 6.

A third embodiment of the invention is shown in FIGS. 9, 10 and 11, wherein FIG. 9 shows a partial vertical section along IX—IX of FIGS. 10 and 11', whereas.

A fourth embodiment of the invention is shown in FIGS. 12 and 13, wherein in FIG. 12 shows a fuel assembly in partial vertical section along XII—XII of FIG. 13; whereas.

DESCRIPTION OF PREFERRED EMBODIMENTS

Figure 1:
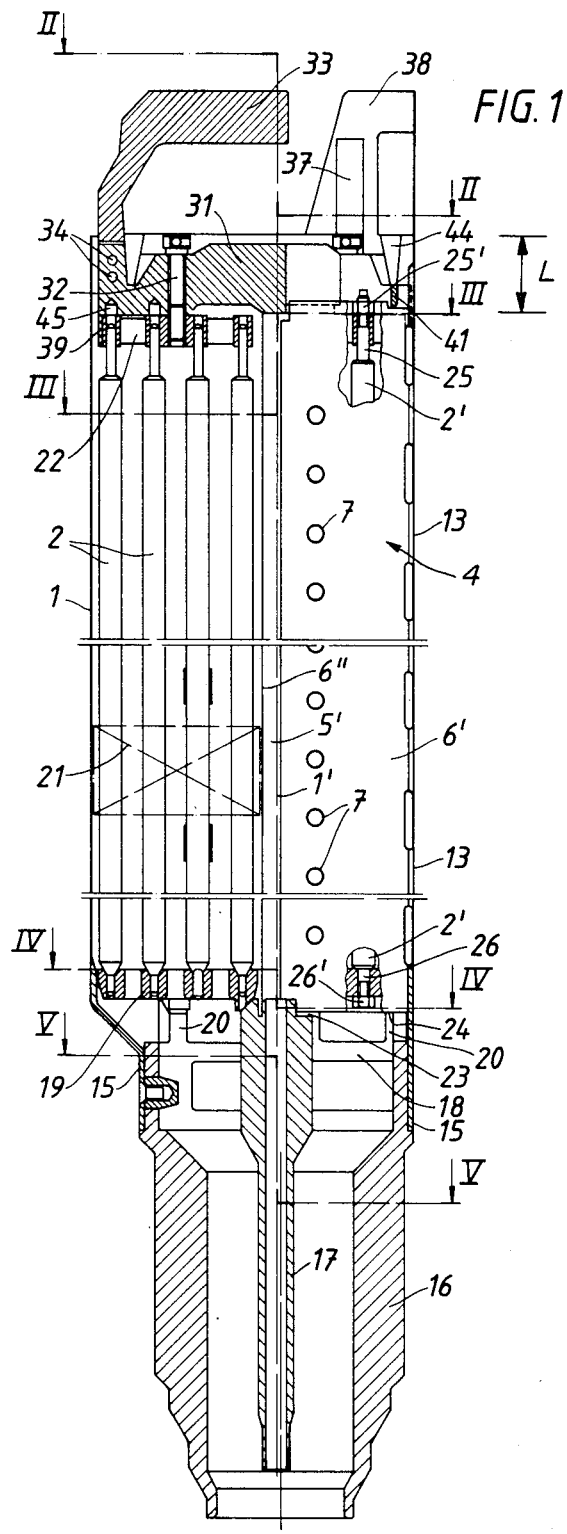
Figure 2:
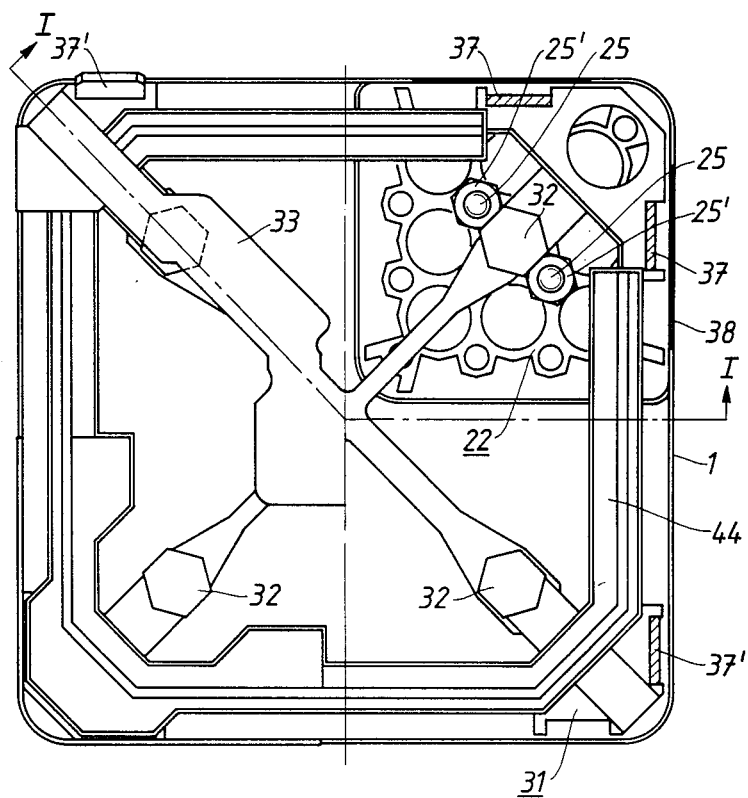
Figure 3:
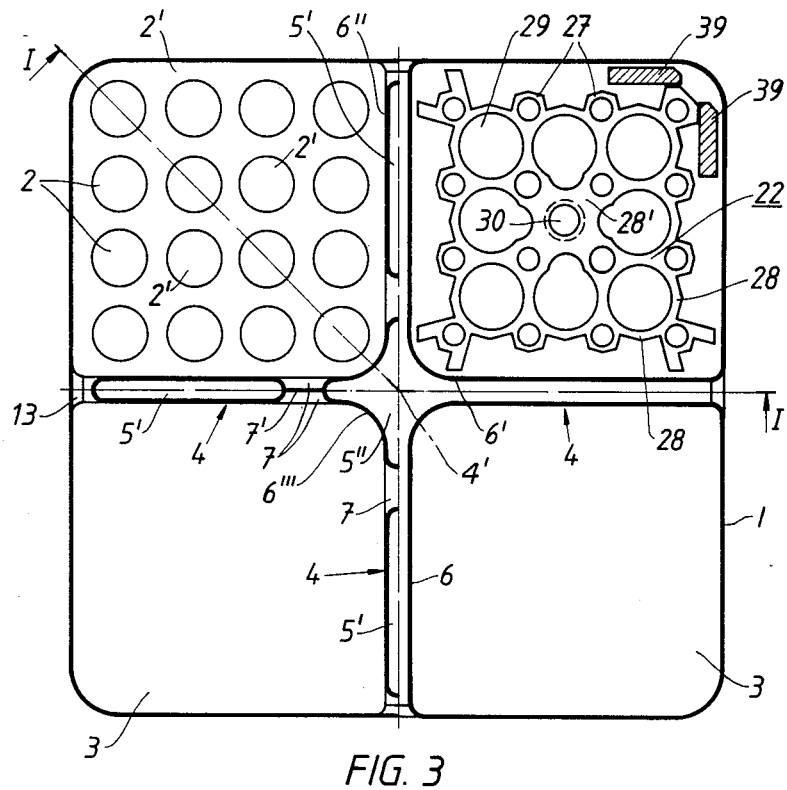
Figure 3A:
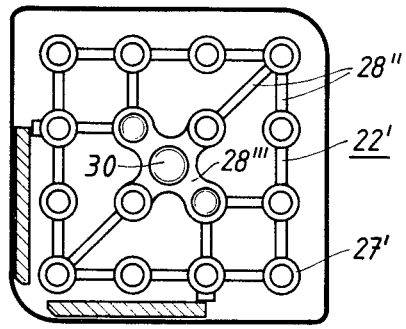
FIG. 3A shows an alternative embodiment of the partial top grid shown in FIG. 3.
Figure 4:
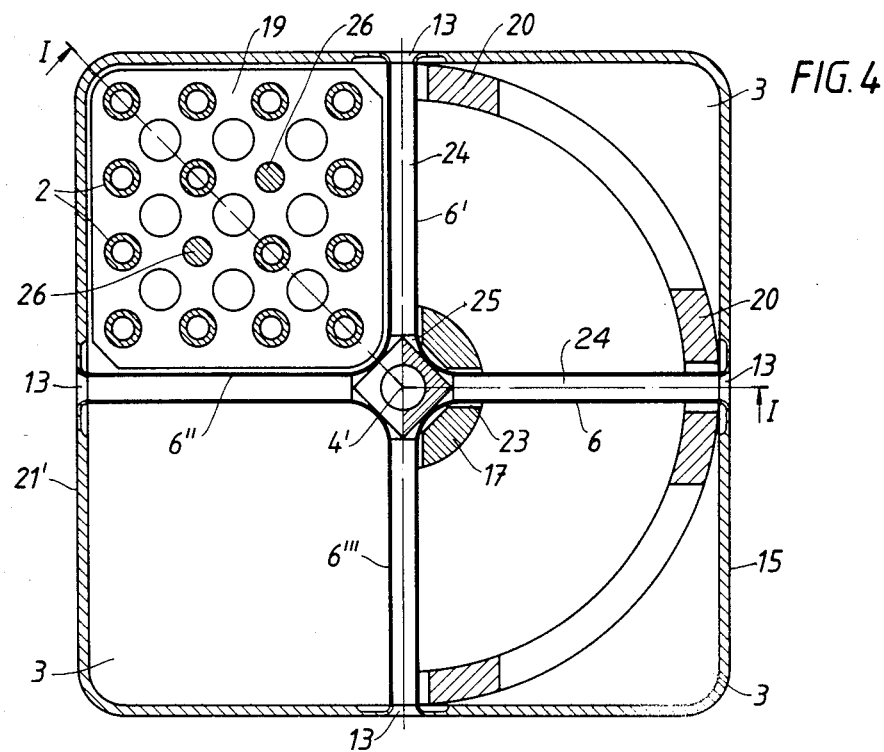
Figure 5:
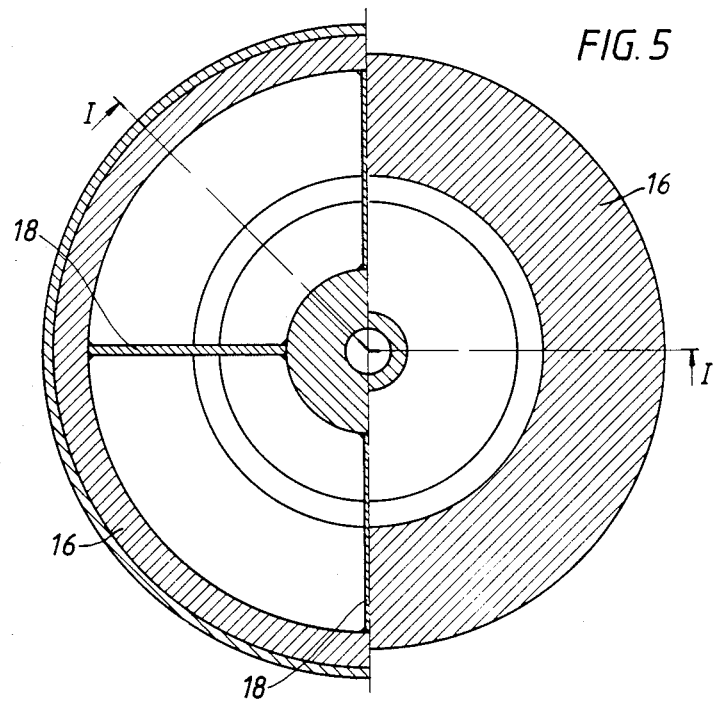

In FIGS. 1-3, the numeral 1 designates a fuel channel device for a fuel assembly intended for a boiling water reactor. The vertical center line of the fuel assembly is designated 1' in FIG. 1. The fuel channel device 1 surrounds sixty-four fuel rods 2 and 2', which are evenly distributed among four partial bundles, each of which is surrounded by a partial fuel channel 3 as shown in FIGS. 3 and 4. An upper portion of the fuel channel device 1, having a length L and being above the location of the fuel rods 2, as shown in FIGS. 1, 3, 6, and 12, has a projection in an imaginary horizontal plane extending through the mid-portion of the fuel rods, forming a square with rounded corners, the square surrounding the partial bundles in such a way that each of the four quadrants of the square surrounds one partial bundle. The partial fuel channels 3 have been formed by dividing the fuel channel of the fuel assembly into four parts along a vertical distance of approximately the same length as the fuel rods, by means of a hollow stiffening device of cruciform cross-section. The stiffening device has a vertical center line 4' and four stiffening wings 4. Each wing 4 comprises a vertical passageway or flow path 5' for relatively cold moderator water. The stiffening device is composed of four elongated, vertical sheet metal elements or channel walls 6, 6', 6", 6''' of L-shaped cross-section extending along a predominant part of the vertical extension of the fuel rods below the upper portion of length L. In this specification, "predominant" is used in its commonly accepted sense to indicate prevalence over all others in magnitude. Each stiffening wing 4 comprises two parallel sheet metal portions arranged in mutually spaced relationship to each other, each metal portion belonging to a corresponding L-shaped sheet metal element. In each stiffening wing, as shown in FIGS. 1 and 3, a plurality of mutually confronting nozzles 7, made in the sheet metal elements, are welded together by a welding seam 7' so as to form a plurality of hydraulic connections between adjacent partial fuel channels 3. However, the channel walls 6, 6', 6", 6'" prevent horizontal communication between passageways 5' and the interior of each partial fuel channel 3.

The fuel channel device 1 is made of Zircaloy ® and is welded to a Zircaloy ® sleeve 15 having a lower portion made with square cross-section. The sleeve 15 is screwed to a lower part base 16, which at its lowermost part has a central, downwardly directed inlet opening for the water flow supplied to the fuel assembly. A water tube 17 is fixed in the middle of the lower part 16 by means of a plurality of radially directed arms 18, which are welded to the lower part 16 and the water tube 17. Each partial fuel channels 3 comprises a partial bundle of sixteen fuel rods, which are supported by a corresponding bottom tie plate or grid 19 as shown in FIGS. 1 and 4. The four bottom grids rest on the upper end of the water tube 17 and on a plurality of axial projections 20, provided in the upper end portion of the lower part 16. Each partial bundle is provided with a plurality of spacer devices 21 arranged vertically one after the other, only one being shown in FIG. 1, and with a partial top tie plate or grid 22 as shown in FIGS. 1-3. The lower ends of the elongated L-shaped sheet metal elements 6, 6', 6", 6'" are arranged in four horizontal slots 23, formed in the upper end of the water tube 17 as shown in FIGS. 1 and 4, whereby the interior of the stiffening device is hydraulically connected to the water tube 17. Each stiffening wing 4 is provided with a tight bottom 24, the radially inner edge of which forms part of the circumference of a central inlet opening 25, intended for a flow of moderator water flowing through the flow paths 5' and 5". Each water flow path 5' communicates with the surrounding interassembly core space via a plurality of nozzles 13 arranged along the length of each stiffening wing 4, as shown in FIGS. 1, 3 and 4;

In each partial bundle, two of the sixteen fuel rods are made as tie rods 2', that is, adapted for force transmission. Similarly to the other fuel rods 2, the tie rods 2' are arranged with the axially extending pins of their lower end plugs in corresponding through-holes in the bottom tie plate 19 and with the axially extending pins of their upper end plugs in corresponding, substantially hollow-cylindrical portions of the partial tip tie plate 22. In the tie rods 2' the upper end pins 25 are passed through the partial top grid 22 and provided with nuts 25', and the lower end pins 26 are passed through the bottom grid 19 and provided with nuts 26', as shown in FIG. 1. The other fuel rods 2, however, are arranged in the bottom grid with freedom of movement in a direction vertically upward. In this arrangement, the tie rods 2' can transmit tensile force from above to the bottom grids.

Each partial top grid 22 is formed with sixteen fuel rod positions arranged in a square lattice and comprises sixteen substantially hollow-cylindrical portions 27 as shown in FIG. 3 and a plurality of connecting portions, one of which constitutes a middle portion and is designated 28', the others being designated 28. Just as the hollow-cylindrical portions, the middle portions 28 and 28' constitute integral parts of the partial top grid. The connecting portions 28 and 28' connect the hollow-cylindrical portions to each other and, together with external surfaces thereof, define a plurality of passageways or openings 29 for reactor coolant formed in the partial top grid 22. The central connecting portion 28' is directly connected to the four hollow-cylindrical portions 27 located nearest the mid-point of the partial top grid. The axes of two of these four portions 27 lie in a vertical plane passing through the mid-point of the partial top grid, but not through the center line of the fuel assembly. Each of these two hollow-cylindrical portions surrounds an end pin 25 in a corresponding tie rod 2' of the partial assembly as shown in FIGS. 1 and 2. In each partial top grid the central connecting portion 28 is provided at its mid-point with a threaded hole 30, and the four partial top grids are attached to a common top tie plate or lifting plate 31 arranged within the upper portion of lenght L, as shown in FIGS. 1, 2, 2A, 2B and 6 by means of four screw bolts 32, each of which is passed through a vertical hole 32' in the top tie plate 31 and screwed into a corresponding hole 30 in such a way that upwardly-facing surfaces of the partial top grids 22 are passed against downwardly-facing surfaces of the top tie plate 31. Thus, the common tie plate 31 can transmit tensile force from above to the four partial top grids 22 which, in turn, can transmit tensile force via tie rods 2' to the bottom grids 19, thereby facilitating simultaneous removal of all four partial bundles in one lifting operation. Each head of the screw bolts 32 makes contact with a corresponding upwardlyfacing surface portion 36 of the top tie plate 31. The top tie plate 31 is formed with four corner portions 40, which together with four intermediate horizontal, rod-shaped portions 41 form a substantially square frame which fits, with no mentionable play, within the previously mentioned upper portion of the fuel channel device 1. The corner portions 40, the rod-shaped portions 41 and a spider 42 constitute integral parts of the top tie plate 31. Two of the corner portions 40 are each provided with a hole 43 for the purpose of facilitating the passage of reactor coolant, whereas the other two support a lifting loop 33, which at each end is attached to the top tie plate by means of two through-going horizontal pins 34, which are passed through corresponding holes 34' in a lug 35, provided in the top tie plate, and fixed by means of welding. Alternatively, the lifting loop 33 may be constructed as an integral part of the top tie plate 31.

Figure 2A:
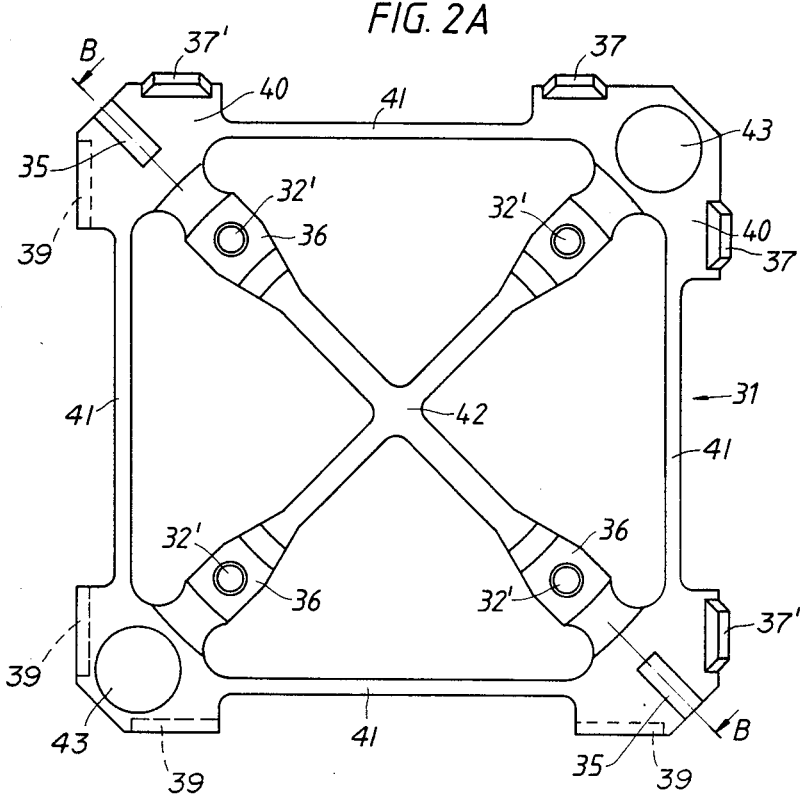
FIG. 2A shows a view from above of a top tie plate included in the abovementioned first embodiment.
Figure 2B:
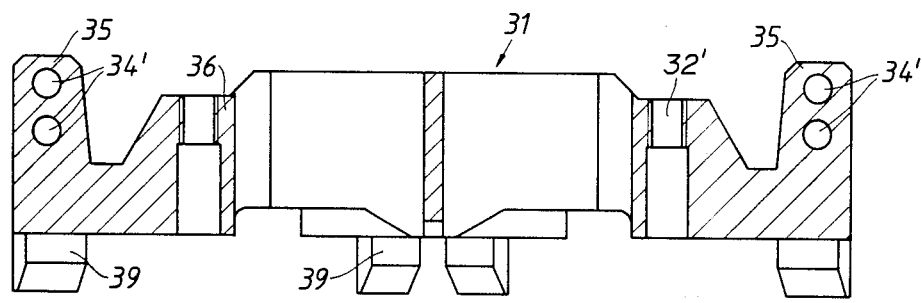
FIG. 2B shows the same top tie plate in section along B—B of FIG. 2A.

The top tie plate 31 is provide in one of the corners with two, substantially vertically directed leaf springs 37 shown in FIGS. 1, 2 and 2A, which make contact with the inner side of a lifting lug 38 welded to the upper edge of the fuel channel device. The lifting lug is dimensioned, together with a lifting lug of the same kind arranged at the opposite corner, to be loaded with the weight of the entire fuel assembly. Further, the top tie plate is provided at opposite corners with two, substantially vertically directed leaf springs 37', intended to make contact with vertical surfaces in the top tie plate of the reactor core (not illustrated). In each corner the top tie plate 31 has two downwardly-directed projections 39 with vertical rest surfaces, which make contact with corresponding vertical surface portions of the partial top grids 22.

The top tie plate 31 supports a distribution channel 44 for sprinkling water, channel 44 running along a predominant part of the circumference of the fuel assembly, as shown in FIG. 2.

Alternatively, instead of the partial top grid 22, it is possible to use the partial top grid 22' shown in FIG.

3A, in which one central connecting portion is designated 28''' and the other 28''. The connecting portions connect together sixteen hollow-cylindrical portions 27'. The two diagonally extending connecting portions are each positioned immediately below a corresponding arm of the spider 42 of the top tie plate.

As is shown in FIG. 1, the top tie plate 31 has on its underside several portions which make contact with hollow-cylindrical portions 27 of partial top grids 22 and are provided with bores or cylindrical recesses 45 which are adapted for receiving corresponding end pins of the fuel rods 2 when these are expanded due to high temperature.

Figure 6:
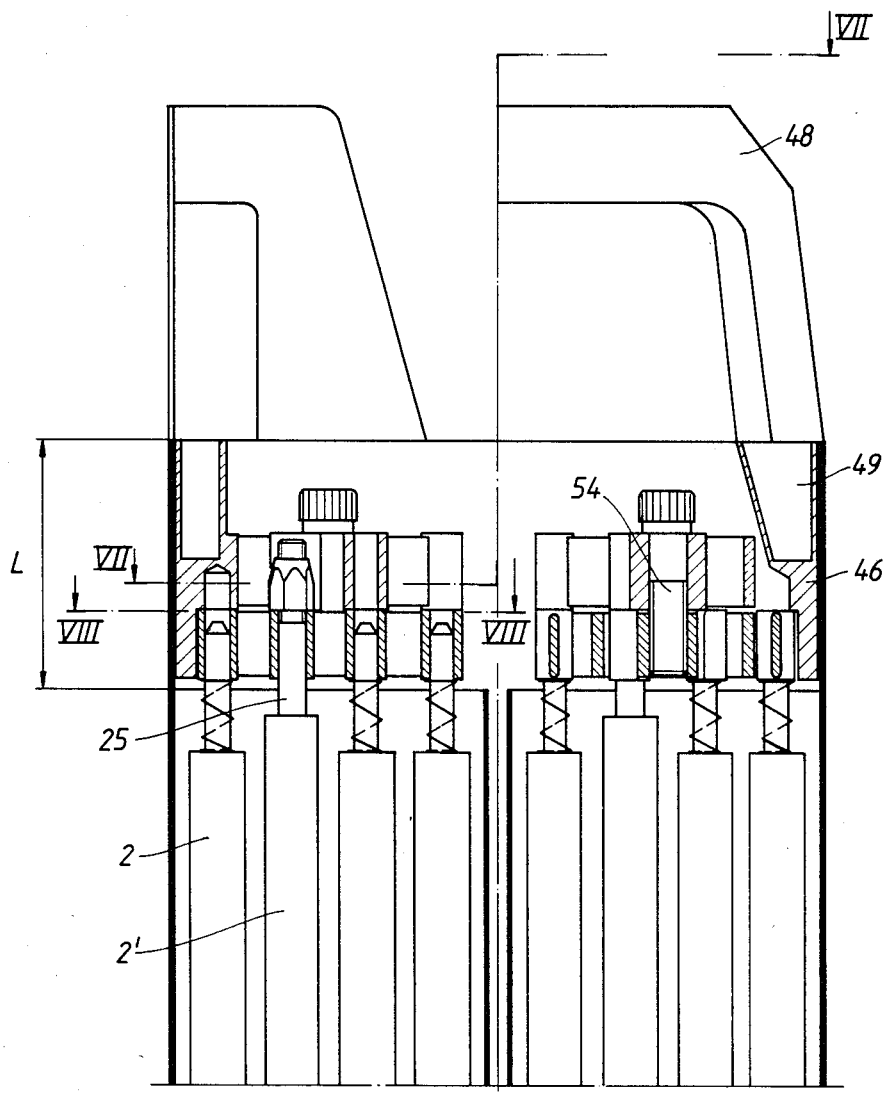
Figure 7:
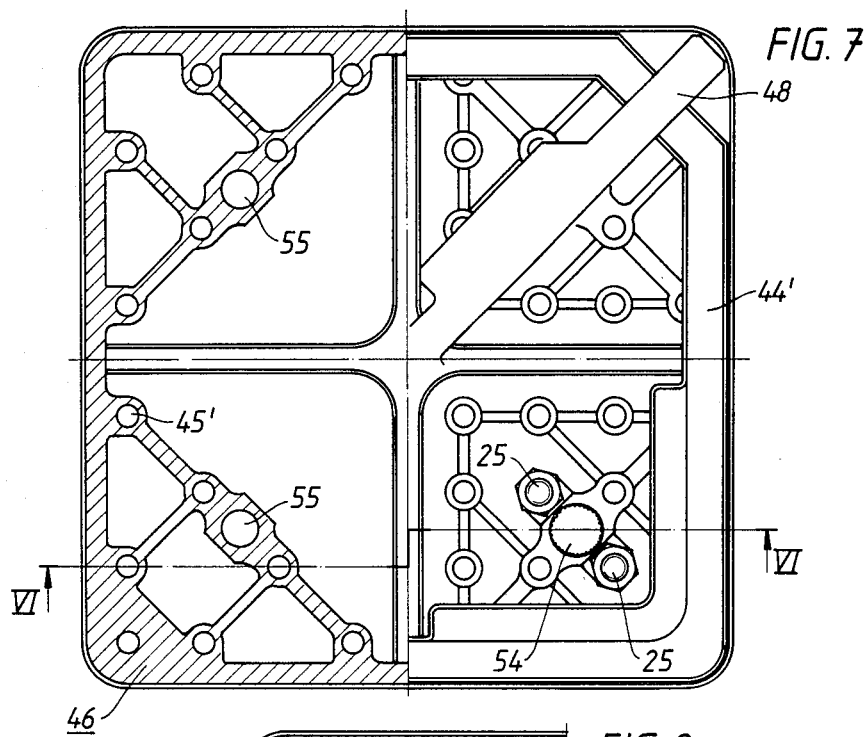
Figure 8:
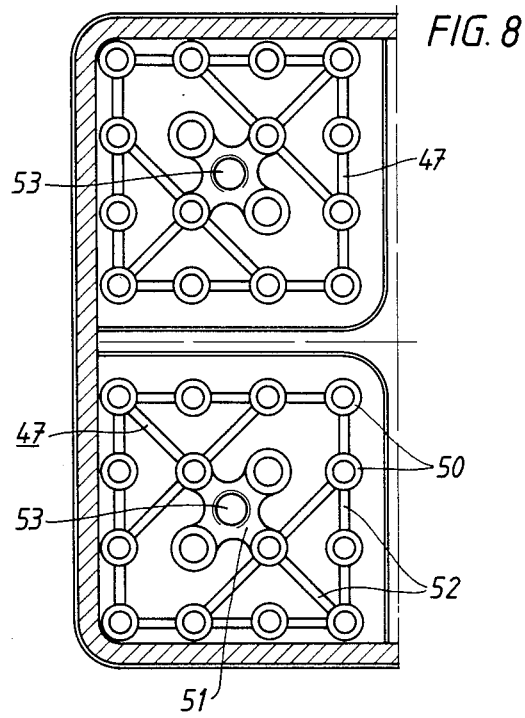

The fuel assembly shown in FIGS. 6, 7 and 8 differs from that described above only in that the common top tie plate 46 and the partial top grids 47 deviate from the corresponding details in the fuel assembly described above. The top tie plate 46 has in each quadrant seven drilled holes 45' adapted for receiving fuel rod end pins, and is provided with a lifting loop 48 which constitutes an integral part. Upwardly-facing surfaces of the top tie plate constitute the bottom in a water distribution channel 49. Each partial top grid has a plurality of hollow-cylindrical portions 50 and a central connecting member which is designated 51, the other connecting members between the portions 50 being designated 52. Each member 51 has a centrally disposed threaded hole 53. Four bolts 54 are passed through the top tie plate 46 through corresponding holes 55 and screwed into four corresponding holes 53. Each quadrant of the top tie plate 46 has at least five diagonally directed, elongated portions extending between vertical fuel rod axes. The horizontal projections of these portions mainly cover the corresponding connecting portions 51 and 52 of the partial top grids 47. The fuel assembly comprises in total eight tie rods. In each partial bundle, two of these tie rods are positioned with their axes in a vertical plane through the center line of the partial bundle and the fuel assembly.

Figure 9:
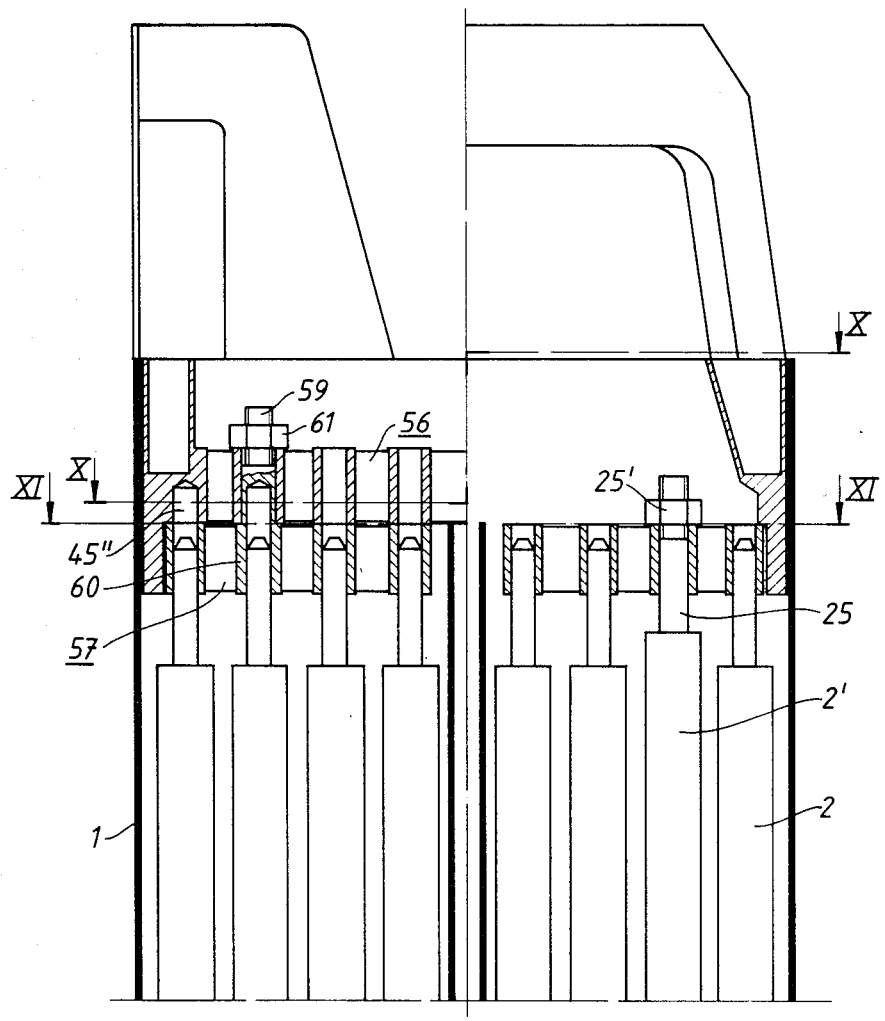
Figure 10:
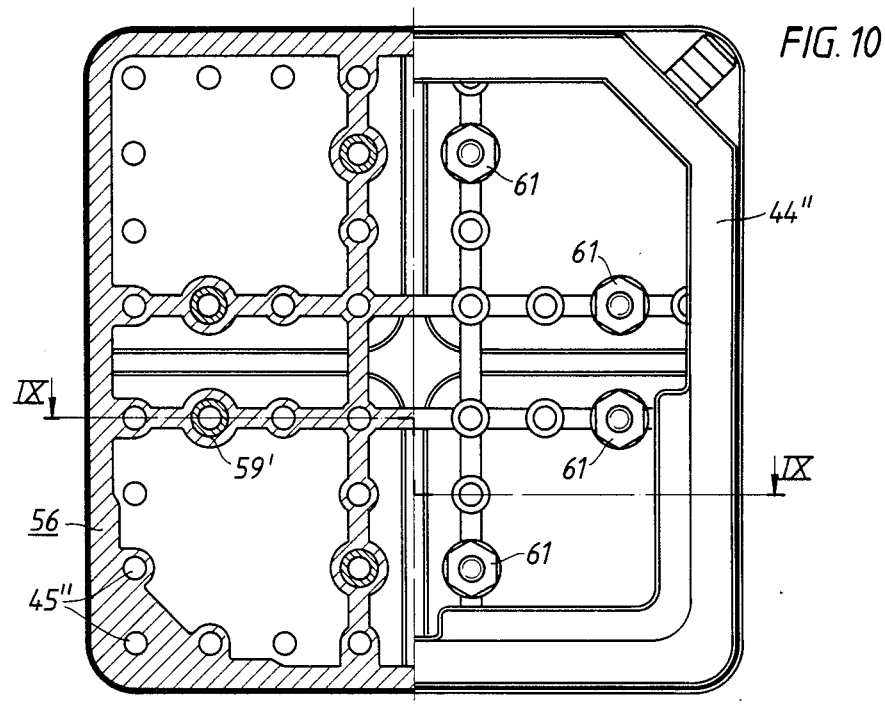
FIGS. 10 and 11 show horizontal section along X—X and XI—XI, respectively, of FIG. 9.
Figure 11:
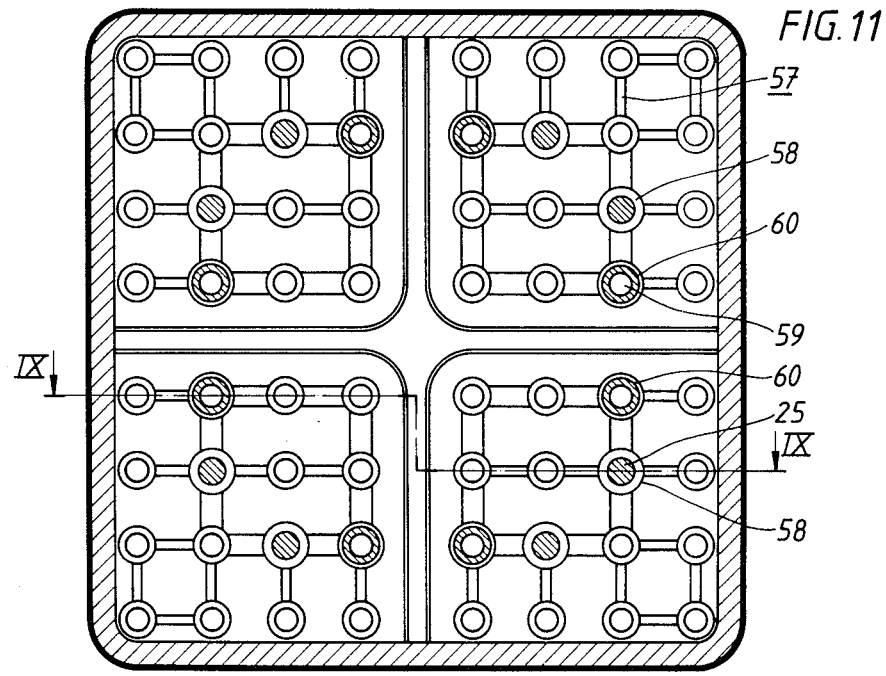

The embodiment shown in FIGS. 9, 10 and 11 differs from that described above as regards the design of the common top tie plate 56 and the four partial top grids 57. Each partial top grids 57 has sixteen hollow-cylindrical portions corresponding to sixteen fuel rod positions. Each partial bundle comprises two tie rods 2', the top pins of which are designated 25 and are arranged in two hollow-cylindrical portions, designated 58, each provided with a nut 25'. Each partial top grid is attached to the top tie plate 56 by means of two upwardly extended hollow-cylindrical portions 60, which are each provided with a solid threaded end portion 59. Each of the threaded end portions 59 is passed through a hole 59' in the top tie plate 56 and are each provided with a nut 61. The holes 45'' have the same purpose as the holes 45 and 45' shown in FIGS. 1 and 7, respectively.

In the embodiments of FIGS. 1 to 11, bolts 32, 54 and 59–61 are accessible from above the fuel assembly so that the common top tie plates 31, 46 and 56 can be removed from the fuel channel. As a result, individual partial bundles and their associated bottom grids and top grids can be removed from the fuel channel as separate units. Of course, where the common top tie plates are left in place, all of the bottom grids, fuel rods, top grids and the common top tie plate can be removed as a unit from the fuel channel.

Figure 12:
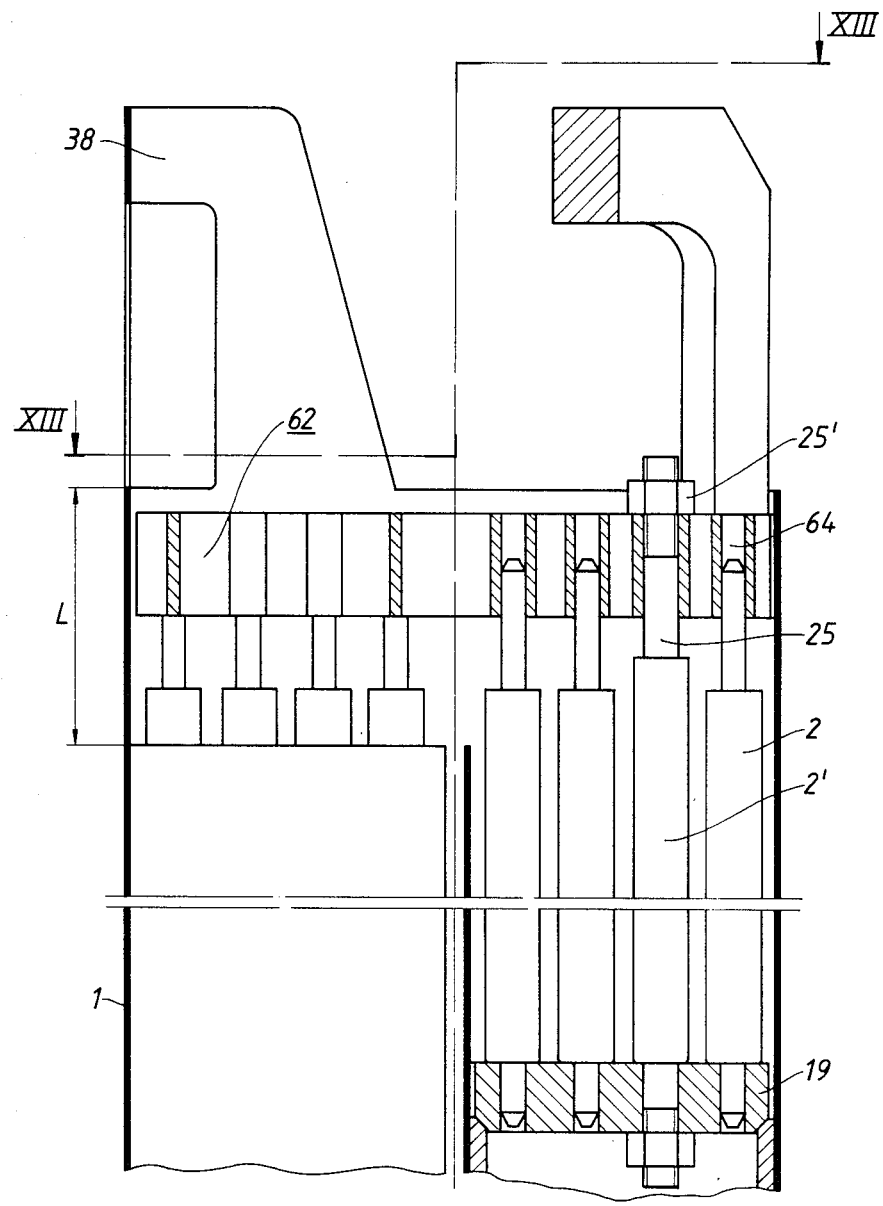
Figure 13:
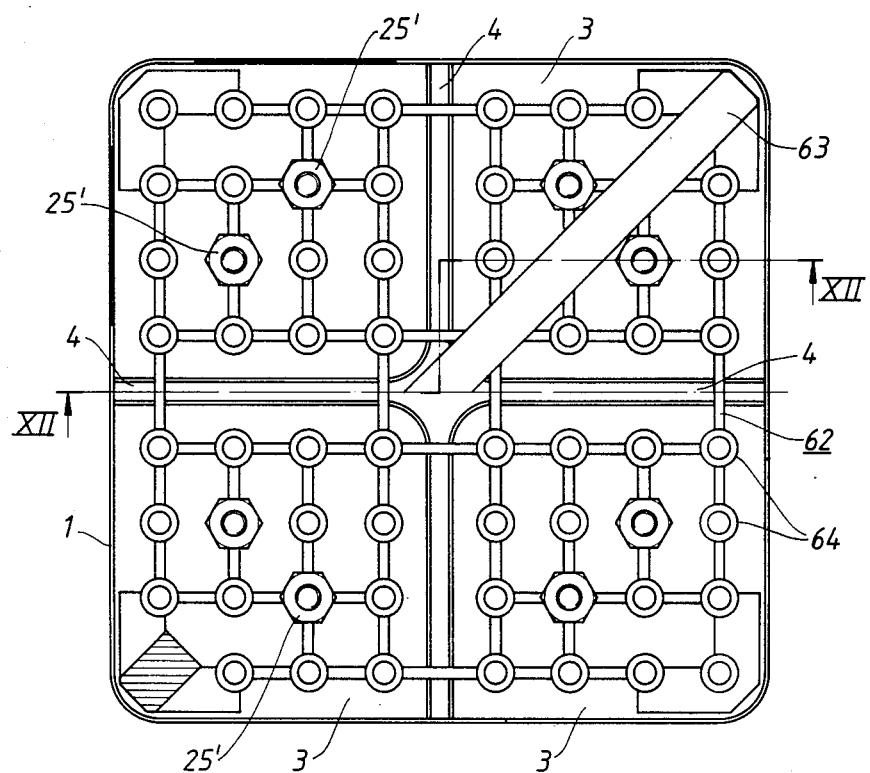
FIG. 13 shows a horizontal section along XIII—XIII of FIG. 12.

The fuel assembly shown in FIGS. 12 and 13 differs from the other fuel assemblies in that its upper end is constructed in a different way. The fuel assembly comprises four partial bundles of fuel rods 2 and 2', each partial bundle comprising two tie rods 2'. The fuel channel system 1 is divided into four partial fuel channels 3 by means of four supporting wings 4 and is provided with two lifting lugs 38 in the same way as is shown in FIG. 1. Each of the four partial bundles is provided with a bottom grid 19. The fuel assembly is constructed with a top tie plate 62 which, in accordance with the above-described common top tie plates, serves the purpose of positioning the four partial bundles. In addition, the top tie plate functions as a common top grid to position of the fuel rods in each partial bundle in relation to each other. This is because common top grid 62 is formed with sixty-four hollow-cylindrical portions 64, corresponding to a fuel rod position each. The top tie plate or grid 62 is provided with a lifting loop 63 which constitutes an integral part. Each tie rod 2' is passed through a bottom grid 19 with its lower end pin 26, which provided with a nut 26', the upper end pin 25 in a corresponding way being passed through the top tie plate or grid 62 and being provided with a nut 25'. Just as the top tie plates described above, the top tie plate or grid 62 is arranged in an upper portion of the fuel channel sysem 1. This portion is not divided into four parts since it is disposed above the supporting wings 4.

In the embodiment of FIGS. 12 and 13, nuts 25' are accessible from above the fuel assembly so that the top tie plate 62 can be removed from the fuel channel. Thus, individual partial bundles and their associated bottom grids and tie rods can be removed from the fuel channel as separate units. Of course, where the top tie plate is left in place, all of the bottom grids, fuel rods, tie rods and the top tie plate can be removed as a unit from the fuel channel.

The drawings only show fuel assemblies having sixty-four fuel rod positions. The invention also comprises fuel assemblies having a greater or smaller number of fuel rod positions, for example a fuel assembly having four partial assemblies and twenty-five fuel rod positions in each partial assembly.

We claim:

1. A fuel assembly for a boiling water reactor, comprising:
   a base provided with a downwardly directed inlet opening for coolant;
   a fuel channel fixedly attached to and extended upward from said base, said fuel channel having a vertical longitudinal axis, said fuel channel having lifting lugs attached to said fuel channel and adapted for lifting the entire fuel assembly, and said fuel channel being divided into four quadrants;
   a lifting plate laterally positioned within said fuel channel at an upper portion of said fuel channel, said lifting plate comprising a handling member to be grasped during a lifting operation;
   four bottom grids positioned within said fuel channel and supported by said base;
   a plurality of vertical fuel rods positioned within said fuel channel and supported at their lower ends by said bottom grids, said fuel rods comprising four separate, partial bundles of fuel rods with a partial bundle for each of said four bottom grids, each partial bundle being surrounded by one of said quadrants, the majority of the fuel rods in each partial bundle being supported on a bottom grid with freedom of movement in a direction vertically upwards, at least one of the fuel rods in each partial bundle being a tie rod attached to a bottom grid with the ability to transmit tensile force to the bottom grid;

a plurality of spaces between said four partial bundles, said spaces being each provided with channel walls extending along a length greater than half the longitudinal length of said fuel rods, said channel walls extending below said lifting plate, said channel walls defining vertical flow paths for moderator water while preventing horizontal flow of said moderator water between said vertical flow paths and the interiors of said four bundles;

four top grids positioned within said fuel channel and engaged with the uper ends of all said fuel rods all of all said partial bundle, said majority of fuel rods in each said partial bundle also being engaged with one of said four top grids with freedom of movement in a direction vertically upwards, said at least one tie rod being attached to a top grid with the ability to transmit tensile force from the top grid to the bottom grid; and means accessible from above the fuel assembly for releasably attaching said lifting plate to said top grids whereby said lifting plate is attached to all of said top grids, whereby upon application of tensile force to said handling member, all of said four bottom grids, fuel rods, four top grids and lifting plate can be removed as a unit from said fuel channel; or whereby upon removal of said lifting plate by releasing said means for attaching, said four partial bundles and their associated bottom grids and top grids can be removed as separate units from said fuel channel.

2. A fuel assembly accordinglyto claim 1, wherein said fuel rods comprise upper end pins; each top grid is disposed adjacent to the lower side of said lifting plate; and said lifting plate is provided with cylindrical recesses adapted to receive said uper end pins.

3. A fuel assembly according to claim 1, wherein said tie rods comprise upper end pins; each of said top grids is formed with sixteen fuel rod positions arranged in a square lattice and comprises sixteen corresponding substantially hollow-cylindrical portions as well as a plurality of connecting portions which connect said hollow-cylindrical portions with each other and together with external surfaces thereof define a plurality of passageway openings for reactor coolant provided in said top grids, one of said connecting portions comprising a central portion directly connected to four hollow-cylindrical portions located nearest the mid-portion of said top grid, two of said four hollow-cylindrical portions lying with their axes in one and the same vertical plane through said mid-portion, said two hollow-cylindrical portions receiving said upper end pins; and said central portion being mechanically connected to said means for releasably attaching.

4. A fuel assembly according to claim 3, wherein said means for releasably attaching comprises a bolt arranged with its head in contact with an upwardly-facing surface of said lifting plate, said bolt being extended through said lifting plate and screwed with its lower end into a threaded hole provided at the center of said central portion.

5. Fuel assembly according to claim 1, wherein said lifting plate comprises a frame-like, substantially square portion, which fits with no mentionable play within and is surrounded by said upper portion of said fuel channel, said frame-like portion comprising a water channel.

6. A fuel assembly for a boiling water reactor, comprising:

a base provided with a downwardly directed inlet opening for coolant;

a fuel channel fixedly attached to and extended upward from said base, said fuel channel having a vertical longitudinal axis, said fuel channel having lifting lugs attached to said fuel channel and adapted for lifting the entire fuel assembly, and said fuel channel being divided into four quadrants;

four bottom grids positioned within said fuel channel and supported by said base;

a plurality of vertical fuel rods positioned within said fuel channel and supported at their lower ends by said bottom grids, said fuel rods comprising four separate, partial bundles of fuel rods with a partial bundle for each of said four bottom grids, each partial bundle being surrounded by one of said quadrants, the majority of the fuel rods in each partial bundle being supported on a bottom grid with freedom of movement in a direction vertically upwards, at least one of the fuel rods in each partial bundle being a tie rod attached to a bottom grid with the ability to transmit tensile force to the bottom grid;

a top grid positioned within said upper portion of said fuel channel and engaged with the upper ends of all said fuel rods of all of said partial bundles, said majority of fuel rods also being engaged with said top grid with freedom of movement in a direction vertically upwards, said at least on tie rod being attached to said top grid with the ability to transmit tensile force from said top grid to said bottom grid, said top grid comprising a handling member to be grasped during a lifting operation;

a plurality of spaces between said partial bundles, said spaces being each provided with channel walls extending along a length greater than half the longitudinal length of said fuel rods, said channel walls extending below said top grid, said channel walls defining vertical flow paths for moderator water while preventing horizontal flow of said moderator water between said vertical flow paths and the interiors of said partial bundles; and means, accessible from above the fuel assembly, for releasably attaching said tie rods to said top grid, whereby upon application of tensile force to said handling member, all of said four bottom grids, fuel rods and top grid can be removed as a unit from said fuel channel; or whereby upon removal of said top grid by releasing said means for attaching, said four partial bundles and their associated bottom grids can be removed as separate units from said fuel channel.

7. A fuel assembly according to claim 6, wherein said top grid is formed with a plurality of hollow-cylindrical portions each corresponding to a fuel rod position; and each tie rod comprises an upper end pin which extends through one of said hollow-cylindrical portions and is secured with a nut arranged above said top grid.

* * * * *